S. D. MOSHER.
SPRING TIRE.
APPLICATION FILED FEB. 12, 1915.
1,160,747.
Patented Nov. 16, 1915.
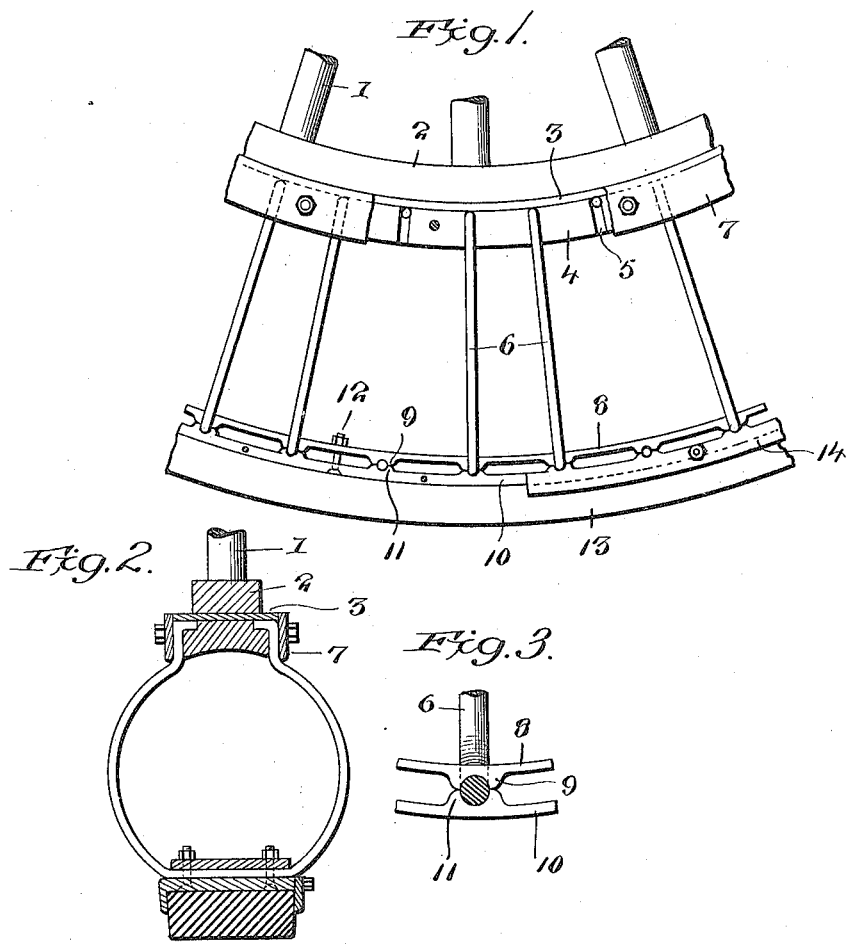
Witnesses
M. E. Laughlin
M. L. Toft
Inventor
Sylvenus D. Mosher,
By Victor J. Evans
Attorney

UNITED STATES PATENT OFFICE.

SYLVENUS D. MOSHER, OF STORM KING-ON-THE-HUDSON, NEW YORK.

SPRING-TIRE.

1,160,747. Specification of Letters Patent. Patented Nov. 16, 1915.

Application filed February 12, 1915. Serial No. 7,807.

*To all whom it may concern:*

Be it known that I, SYLVENUS D. MOSHER, a citizen of the United States, residing at Storm King-on-the-Hudson, in the county of Dutchess and State of New York, have invented new and useful Improvements in Spring-Tires, of which the following is a specification.

This invention relates to spring tires and it consists in the novel features hereinafter described and claimed.

An object of the invention is to provide a tire of simple and durable structure provided in the vicinity of its peripheries with resilient means which extends completely around the wheel and which permits the central portion of the wheel to have vertical movement with relation to the peripheral portion thereof, whereby the wheel is rendered resilient in its vertical plane. The parts of the resilient means are so arranged that the central portion of the wheel will have little or no lateral movement with relation to the peripheral portion and consequently the wheel is resilient in its vertical plane and practically rigid in all other directions.

In the accompanying drawing:—Figure 1 is a side elevation of one form of the tire with parts broken away and parts removed. Fig. 2 is a transverse sectional view of the tire. Fig. 3 is a detailed sectional view of parts of the tire as shown in Fig. 1.

As shown in Figs. 1 and 2 the tire is applied to a wheel which includes spokes 1 connected at their outer ends with a rim 2. A ring 3 surrounds the rim 2 and lies in close proximity to the same. A ring 4 surrounds the ring 3 and is provided at its inner surface and sides with channels 5. Links 6 are seated at their inner portions in the channels 5 and the said links are formed from a resilient steel or other suitable resilient material. Annular plates 7 are secured to the opposite sides of the rings 4 and 3 best shown in Fig. 1 of the drawing and the inner surfaces of the said plates bear against the outer sides of the links 6 and brace the same. The links 6 are radially disposed with relation to the wheel and inasmuch as the inner ends of the said links are secured in the channels 5 by the plates 7 the inner ends of the said links are practically rigidly connected with the central portion of the wheel.

A ring 8 passes through the outer portions of the links 6 and the said ring 8 is provided at its outer side with spaced lugs 9 arranged in pairs. The members of the pairs of lugs 9 receive between them the intermediate parts of the links 6 as most clearly shown in Fig. 1 of the drawing and the lugs 9 are in close contact with the links. However the links 6 may have slight swinging movement between the lugs 9. A ring 10 surrounds the tread portions of the links 6 and is provided at its inner side with spaced lugs 11 corresponding in number with the lugs 9 and also arranged in pairs. The members of the pairs of lugs 11 snugly receive the outer portions of the links 6 and when the outer portions of the links are secured between the lugs 9 and 11 the adjacent ends of the lugs 9 and 11 are in contact with each other as shown in Fig. 3 of the drawing. Bolts or other suitable securing devices 12 may be employed for securing the ring 10 in position with relation to the ring 8. A tire tread 13 is mounted upon the outer surface of the ring 10 and is held in place by means of a plate 14 secured to the side edges of the ring 10 in any suitable manner and which overlap the inner portion of the tire 13.

Therefore it will be seen that a wheel tire structure of simple and durable arrangement is provided and that the wheel has its central portion resiliently supported with relation to its peripheral portion movement in a vertical plane but is restrained against movement in any other direction.

Having described the invention what is claimed is:—

A resilient tire comprising an inner portion and an outer portion, said outer portion being provided at its inner side with spaced lugs, resilient elements secured to the inner portion and bearing against the outer portion at points between the lugs thereon, and a band secured to the outer portion and bearing against the inner sides of the resilient elements and having spaced lugs lying at the opposite sides of the resilient elements.

In testimony whereof I, affix my signature in presence of two witnesses.

SYLVENUS D. MOSHER.

Witnesses:
M. E. LAUGHLIN,
GEO. A. BYRNE.

Copies of this patent may be obtained for five cents each, by addressing the "Commissioner of Patents, Washington, D. C."